US012584584B2

(12) United States Patent
Chang et al.

(10) Patent No.: US 12,584,584 B2
(45) Date of Patent: Mar. 24, 2026

(54) VACUUM SYSTEM COMPONENT MECHANISM

(71) Applicant: KENMEC MECHANICAL ENGINEERING CO., LTD., Taipei City (TW)

(72) Inventors: Shih-Chen Chang, Taipei City (TW); Chih-Chun Ko, Taipei City (TW)

( * ) Notice: Subject to any disclaimer, the term of this patent is extended or adjusted under 35 U.S.C. 154(b) by 77 days.

(21) Appl. No.: 18/736,469

(22) Filed: Jun. 6, 2024

(65) Prior Publication Data

US 2025/0216019 A1 Jul. 3, 2025

(30) Foreign Application Priority Data

Jan. 2, 2024 (TW) ................................. 113100138

(51) Int. Cl.
*F16M 5/00* (2006.01)

(52) U.S. Cl.
CPC ..................................... *F16M 5/00* (2013.01)

(58) Field of Classification Search
CPC ........ F16M 5/00; F16B 5/0233; F04D 29/601
See application file for complete search history.

(56) References Cited

U.S. PATENT DOCUMENTS

| | | | | | |
|---|---|---|---|---|---|
| 5,069,269 | A | * | 12/1991 | Reuter ................... | B22D 18/06 |
| | | | | | 414/217 |
| 6,425,735 | B1 | * | 7/2002 | Sheth ........................ | F16M 5/00 |
| | | | | | 248/689 |
| 7,104,766 | B2 | * | 9/2006 | Mascola ................. | F01C 21/02 |
| | | | | | 417/365 |
| 9,366,240 | B2 | * | 6/2016 | Horley .................... | F04D 29/22 |
| 10,260,517 | B2 | * | 4/2019 | Juarez Ortega ......... | F04D 29/60 |
| 2007/0086906 | A1 | * | 4/2007 | Horley .................... | F04D 29/22 |
| | | | | | 417/423.12 |
| 2015/0030470 | A1 | * | 1/2015 | Juarez Ortega ......... | F04D 29/60 |
| | | | | | 417/234 |
| 2025/0020122 | A1 | * | 1/2025 | Ledet ...................... | F04D 15/00 |
| 2025/0020408 | A1 | * | 1/2025 | Chang ..................... | F27B 14/08 |

FOREIGN PATENT DOCUMENTS

| | | | | |
|---|---|---|---|---|
| CN | 102120553 | A | * | 7/2011 |
| KR | 2007027394 | A | * | 3/2007 |

* cited by examiner

*Primary Examiner* — Eret C Mcnichols

(57) ABSTRACT

A door lock structure is disclosed. The door lock structure is used to mount a fire door and includes a base, a pressing component, a pressing shell and a locking component. The base is disposed on the fire door and has an accommodation groove, and a groove bottom of the accommodation groove has a first locking hole. The pressing component includes a pressing base, a roller column, a fixing plate, an elastic part and a locking part.

7 Claims, 3 Drawing Sheets

20

20

VACUUM SYSTEM COMPONENT MECHANISM

CROSS-REFERENCE TO RELATED APPLICATIONS

This application claims the priority benefit of Taiwan Patent Application TW113100138, filed on Jan. 2, 2024, the full disclosure of which is incorporated herein by reference.

TECHNICAL FIELD

The present application is related to a vacuum system, and particularly is related to an optimized vacuum system component mechanism.

BACKGROUND OF THE INVENTION

As shown in FIG. 1, in the conventional technology, the vacuum system component 10 includes a pump support base 11, a support part 12, a plate 13 and a pump support adjustment base 14. A bottom surface of the pump support base 11 is welded with one end of the support part 12, and the other end of the support part 12 is welded with one surface of the plate 13. Then, the pump support adjustment base 14 is disposed adjacent to the other surface of the plate 13 and is screwed to the plate 13.

However, in the vacuum system component 10 of the conventional technology, if the processing accuracy of the bottom surface of the pump support base 11, the sidewall of the support part 12 or the plate 13 is insufficient, and deviation occurs at the welding portion between the pump support base 11 and the support part 12, when the pump support base 11 is connected to one surface of the plate 13 through the support part 12, deviation occurs at the welding portion between the support part 12 and the plate 13, and thus a gap exists between the pump support base 11 and the support part 12, which may cause the gas in the pump support base 11 leaking out from the gap. If the gas leaks outside, the welding portion should be disassembled, and the positions of the pump support base 11, the support part 12 and the plate 13 should be readjusted, which will take a lot of time. Therefore, it will influence the yield and assemble efficiency of the vacuum system component 10.

Therefore, the existing technology indeed needs to be further improved and there is a need to provide more improved solutions.

SUMMARY OF THE INVENTION

In view of the insufficiency of the existing technology, the main purpose of the present application is to provide an optimized vacuum system component mechanism, by an angle-adjustable manner, the vacuum system component mechanism is more closely connected to avoid leaking gas and consuming assemble time, and to enhance the yield and assemble efficiency of the vacuum system component.

To achieve the abovementioned purpose, the main technical means adopted by optimizing the vacuum system component mechanism, comprising: a pump support base; an upper support part, wherein one end of the upper support part is fixed to a bottom surface of the pump support base; and a joint bearing connected to the other end of the upper support part in an angle-adjustable manner.

Through the abovementioned structure, the joint bearing can dynamically cooperate with the upper support part to make the pump support base, the upper support part and the joint bearing being more closely connected to avoid leaking gas and consuming assemble time. Therefore, the purpose of enhancing the yield and the assemble efficiency of the vacuum system component is achieved.

BRIEF DESCRIPTION OF DRAWINGS

The accompanying drawings herein are provided to have a further understanding on the present application and constitutes a part of the present application. The schematic embodiments and the description of the present application is used to explain the present application instead of constituting inappropriate limitation. In the drawings.

DETAILED DESCRIPTION OF THE INVENTION

Figure 1:
FIG. 1 is a diagram of the vacuum system component mechanism of the prior art.
Figure 1:
Figure 2:
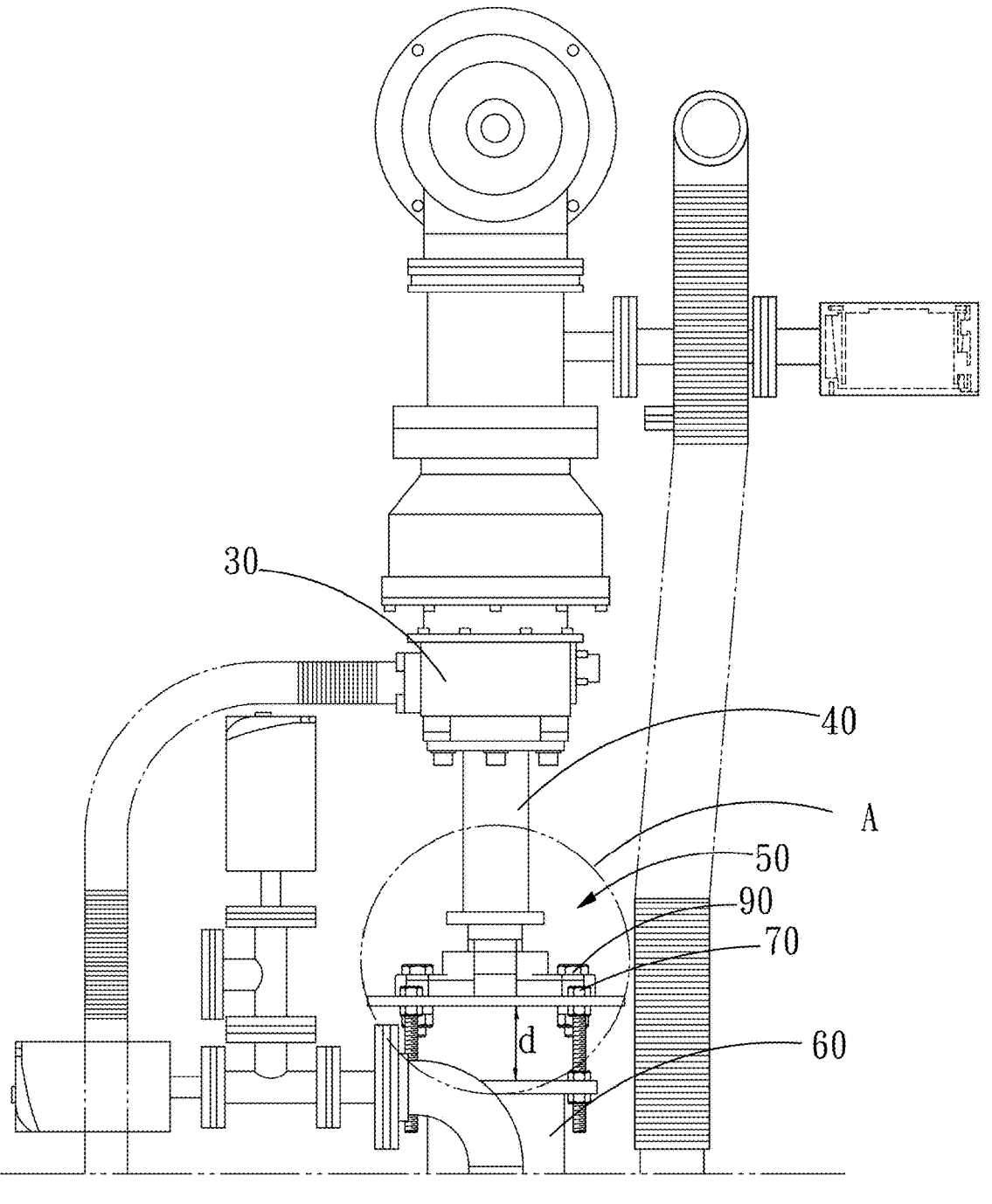
FIG. 2 is a diagram of the optimized the vacuum system component mechanism of the present application.
Figure 3:
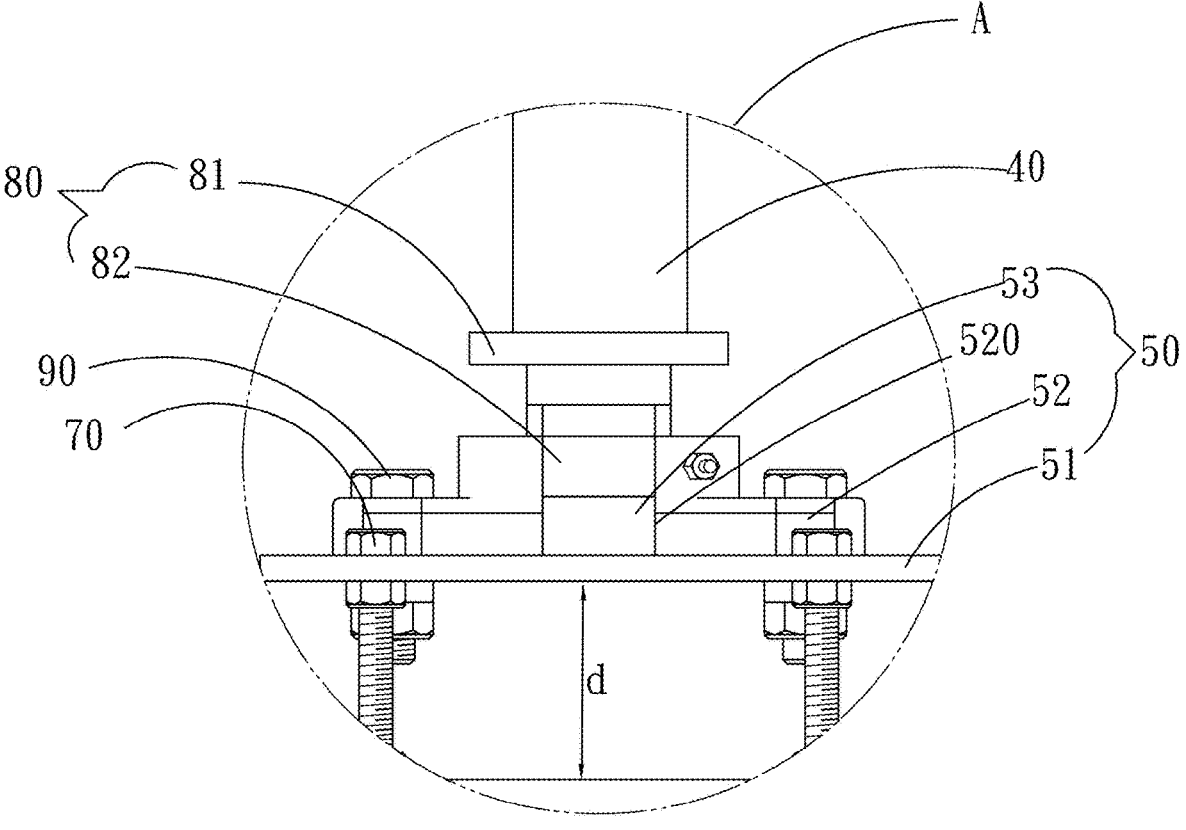
FIG. 3 is an enlarged view of area A in FIG. 2.

Regarding to the preferable embodiment of the optimized vacuum system component mechanism of the present application, as shown in FIG. 2 and FIG. 3, the vacuum system component mechanism is used to optimize a vacuum system 20, the vacuum system 20 includes a pump 30, an upper support part 40, a joint bearing 50 and a pump support adjustment base 60. The joint bearing 50 is disposed on the opposite side of the pump 30. The pump support adjustment base 60 is connected to the joint bearing 50, and adjust the angle of the joint bearing 50 through the upper support part 40, so that the connection level among the pump 30, the upper support part 40 and the joint bearing 50 is improved to avoid leaking gas and consuming assemble time. Thus, the yield and the assemble efficiency of the vacuum system component is enhanced.

Specifically, one end of the upper support part 40 is fixed to the bottom surface of the pump 30 and is used to receive the pumped gas. In this embodiment, when the upper support part 40 and the joint bearing 50 is connected together, and the upper support part 40 is close to the bottom surface of the pump 30, the operator adjusts the angle of the joint bearing 50 through the upper support part 40. In this embodiment, one end of the upper support part 40 is locked on the pump 30.

The joint bearing 50 includes a plate 51, a bearing base 52 and a universal ball bearing 53. The bearing base 52 is disposed on one surface of the plate 51 horizontally, and a center of the bearing base 52 is penetrated to form a through hole 520. The universal ball bearing 53 is rotatably disposed in the through hole 520, and is connected to the upper support part 40 via the universal ball bearing 53. Specifically speaking, the bearing base 52 is screwed on one surface of the plate 51, a shaft hole of the universal ball bearing 53 and the bearing base 52 have an angle between 0 and 90 degrees. Through adjusting the angle between the universal ball bearing 53 and the bearing base 52, the angle of the joint bearing 50 is adjusted accordingly.

Through the abovementioned mechanism, the upper support part 40 is connected with the universal ball bearing 53 first, subsequently, the upper support part 40 is fixed to the bearing base 52, then, when the upper support part 40 connected with the joint bearing 50 closes toward the bottom surface of the pump 30, the angle of the joint bearing 50 can be adjusted through the upper support part 40 so that the upper support part 40 and the bottom surface of the pump 30 is more closely connected. If the operator finds out the condition that gas leak occurs between the pump 30 and the upper support part 40, it is only necessary to unlock the pump 30 and the upper support part 40, and further adjust the angle of the joint bearing 50, and then lock the upper support part 40 on the pump 30. Therefore, the purpose that the yield and the assemble efficiency of the vacuum system component is improved can be achieved.

In this embodiment, the vacuum system 20 further includes multiple first screw components 70. Each of the multiple first screw components 70 screws the plate 51 and the pump support adjustment base 60, respectively. In this embodiment, the plate 51 is disposed parallel to the pump support adjustment base 60. The multiple first screw components 70 penetrate and screw the plate 51 and the pump support adjustment base 60. The plate 51 and the pump support adjustment base 60 have a distance therebetween by the screw thread of the multiple first screw components 70. Hence, the distance can be increased or decreased through adjusting the multiple first screw components 70.

In this embodiment, the vacuum system 20 further includes a connecting device 80. The connecting device 80 is disposed between the upper support part 40 and the joint bearing 50. One end of the connecting device 80 is adjacently connected to the upper support part 40, and the other end of the connecting device 80 is fixed to the joint bearing 50.

In this embodiment, the connecting device 80 includes a connecting plate 81 and a guiding rod 82. One surface of the connecting plate 81 is orthogonally connected to the upper support part 40, and the guiding rod 82 is disposed on and orthogonally connected to the other surface of the connecting plate 81. The guiding rod 82 is connected with a shaft hole of the universal ball bearing 53 at the center of the bearing base 52 to guide the rotation of the universal ball bearing 53 to further adjust the angle. In this embodiment, the connecting plate 81 is welded the upper support part 40 and the guiding rod 82, respectively. The connecting plate 81 is connected to the bearing base 52 of the joint bearing 50, which is accomplished by that multiple second screw components 90 penetrate and screw the bearing base 52. In this embodiment, the upper support part 40 is welded on one surface of the connecting plate 81, and the guiding rod 82 is welded on the other surface of the connecting plate 81.

In summary, when the pump support adjustment base 60 closes the plate 51, the pump support adjustment base 60 is fixed on the plate 51 through the multiple first screw components 70. Then, make the upper support part 40 close to the pump 30, adjust the angle of the joint bearing 50, and make one end of the upper support part 40 and the bottom surface of the pump 30 be firmly connected. Therefore, the pump support base, the upper support part and the joint bearing are more closely connected to avoid leaking gas and consuming assemble time. Therefore, the purpose that the yield and the assemble efficiency of the vacuum system component is improved can be achieved.

The invention claimed is:

1. A vacuum system component mechanism, comprising:
   a pump support base;
   an upper support part, wherein one end of the upper support part is fixed to a bottom surface of the pump support base; and
   a joint bearing connected to an other end of the upper support part in an angle-adjustable manner, wherein the joint bearing comprises:
   a plate;
   a bearing base horizontally disposed on one surface of the plate, wherein a through hole is formed through a center of the bearing base; and
   a universal ball bearing rotatably disposed in the through hole.

2. The vacuum system component mechanism as claimed in claim 1, wherein the bearing base is screwed on one surface of the plate.

3. The vacuum system component mechanism as claimed in claim 2, further comprising:
   a pump support adjustment base disposed parallel to the plate, wherein the pump support adjustment base and the plate are separated by a distance.

4. The vacuum system component mechanism as claimed in claim 3, further comprising:
   a plurality of first screw components, each of the first screw component screws the plate and the pump support adjustment base, respectively.

5. The vacuum system component mechanism as claimed in claim 4, wherein the distance is increased or decreased through adjusting the plurality of first screw components.

6. The vacuum system component mechanism as claimed in claim 5, further comprising:
   a connecting device, and one end of the connecting device is adjacently connected to the upper support part and an other end of which is fixed to the joint bearing.

7. The vacuum system component mechanism as claimed in claim 6, wherein the connecting device comprises:
   a connecting plate, and one surface of the connecting plate is orthogonally connected to the upper support part;
   a guiding rod disposed on and orthogonally connected to the other surface of the connecting plate,
   wherein the guiding rod is connected with a shaft hole of the universal ball bearing at the center of the bearing base.

\* \* \* \* \*